(12) United States Patent
Kim et al.

(10) Patent No.: US 9,678,827 B2
(45) Date of Patent: Jun. 13, 2017

(54) ACCESS COUNTS FOR PERFORMING DATA INSPECTION OPERATIONS IN DATA STORAGE DEVICE

(71) Applicant: SK hynix Inc., Gyeonggi-do (KR)

(72) Inventors: Se Hyun Kim, Gyeonggi-do (KR); Joong Seob Yang, Gyeonggi-do (KR); Eui Jin Kim, Gyeonggi-do (KR); Jong Min Lee, Gyeonggi-do (KR); Jeong Soon Kwak, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 25 days.

(21) Appl. No.: 14/820,261

(22) Filed: Aug. 6, 2015

(65) Prior Publication Data
US 2016/0098201 A1 Apr. 7, 2016

(30) Foreign Application Priority Data

Oct. 7, 2014 (KR) .................. 10-2014-0134982
Mar. 3, 2015 (KR) .................. 10-2015-0029661

(51) Int. Cl.
G06F 11/10 (2006.01)
G06F 3/06 (2006.01)
G06F 12/02 (2006.01)

(52) U.S. Cl.
CPC ............ *G06F 11/10* (2013.01); *G06F 3/0619* (2013.01); *G06F 12/0238* (2013.01); *G06F 12/0246* (2013.01); *G06F 2212/1016* (2013.01); *G06F 2212/1032* (2013.01); *G06F 2212/7204* (2013.01); *G06F 2212/7205* (2013.01)

(58) Field of Classification Search
CPC ............... G06F 11/0727; G06F 11/073; G06F 11/0793; G06F 3/0619; G06F 3/0649; G06F 12/02; G06F 12/0246
See application file for complete search history.

(56) References Cited

U.S. PATENT DOCUMENTS

| 7,818,525 | B1* | 10/2010 | Frost ................ G06F 12/0246 365/185.25 |
|---|---|---|---|
| 2008/0288814 | A1* | 11/2008 | Kitahara ............ G06F 11/073 714/5.1 |
| 2013/0055046 | A1* | 2/2013 | Blodgett ............ G06F 11/106 714/764 |
| 2014/0173180 | A1* | 6/2014 | D'Abreu ............ G06F 12/0246 711/103 |
| 2014/0173239 | A1* | 6/2014 | Schushan ........... G11C 16/3427 711/165 |
| 2015/0262714 | A1* | 9/2015 | Tuers ............... G11C 29/50004 714/721 |

(Continued)

FOREIGN PATENT DOCUMENTS

| KR | 1020090129624 | 12/2009 |
|---|---|---|
| KR | 1020120017830 | 2/2012 |

*Primary Examiner* — Hal Schnee
(74) *Attorney, Agent, or Firm* — IP & T Group LLP

(57) ABSTRACT

A data storage device includes a controller configured to update an access request count and an access count corresponding to a target region based on an access request for the target region, and initialize the access count each time the access request count reaches a first threshold, and a nonvolatile memory apparatus including the target region, and configured to access the target region based on a control of the controller.

31 Claims, 13 Drawing Sheets

(56) References Cited

U.S. PATENT DOCUMENTS

| | | | |
|---|---|---|---|
| 2015/0339188 A1* | 11/2015 | Hu | G06F 11/1072 714/704 |
| 2016/0034194 A1* | 2/2016 | Brokhman | G06F 3/0604 711/103 |
| 2016/0034406 A1* | 2/2016 | Hansson | G06F 13/1673 711/105 |
| 2016/0098215 A1* | 4/2016 | Song | G06F 3/0619 711/103 |

* cited by examiner

US 9,678,827 B2

ACCESS COUNTS FOR PERFORMING DATA INSPECTION OPERATIONS IN DATA STORAGE DEVICE

CROSS-REFERENCES TO RELATED APPLICATION

The present application claims priority under 35 U.S.C. §119(a) to Korean application number 10-2014-0134982, filed on Oct. 7, 2014, and Korean application number 10-2015-0029061, filed on Mar. 3, 2015, in the Korean Intellectual Property Office, which is incorporated herein by reference in its entirety.

BACKGROUND

1. Technical Field

Various embodiments generally relate to a data storage device and, more particularly, to a data storage device and an operating method thereof in which a reliability maintenance operation is performed.

2. Related Art

A data storage device may be configured to store the data provided from an external device, in response to a write request from the external device. Also, the data storage device may be configured to provide stored data to the external device, in response to a read request from the external device. The external device is an electronic device capable of processing data and may include a computer, a digital camera or a mobile phone. The data storage device may be embedded in the external device to operate, or may be manufactured separately and be electrically coupled to the external device to operate.

A data storage device may be configured as a personal computer memory card international association (PCMCIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS) or a solid state drive (SSD).

A data storage device may include a nonvolatile memory apparatus to store data. A nonvolatile memory apparatus may retain stored data even without a constant power source. Examples of nonvolatile memory apparatuses include a flash memory apparatus such as a NAND flash or a NOR flash, a ferroelectric random access memory, (FeRAM), a phase change random access memory (PCRAM), a magnetoresistive random access memory (MRAM) or a resistive random access memory (RERAM).

SUMMARY

Various embodiments are directed to a data storage device with improved data reliability.

In an embodiment, a data storage device may include a controller suitable for updating an access request count and an access count corresponding to a target region based on an access request for the target region, and initializing the access count each time the access request count reaches a first threshold, and a nonvolatile memory apparatus including the target region, and suitable for accessing the target region based on a control of the controller.

In an embodiment, a method for operating a data storage device may include updating an access request count based on an access request; updating a first access count corresponding to a target region of a nonvolatile memory apparatus which is access-requested based on the access request, and initializing the first access count each time the access request count reaches a first threshold.

In an embodiment, a method for operating a data storage device may include mapping an address of a target region, which is access-requested, into a first hash value of a plurality of first hash values based on a first hash function, updating a first access count indexed by the first hash value in a first access count table that includes a plurality of first access counts indexed by the plurality of first hash values, and updating an access request count based on an access request.

In an embodiment, a data storage device may include a storage medium including a plurality of nonvolatile memory apparatuses, and a controller suitable for updating a first access count and a second access count when accessing a target region of the storage medium, wherein the first access count corresponds to a first group including the target region, among first groups into which regions of a first unit are grouped in the storage medium, and the second access count corresponds to a second group including the target region, among second groups into which regions of a second unit are grouped in the storage medium.

In an embodiment, a data storage device may include a storage medium including a plurality of nonvolatile memory apparatuses, and a controller suitable for updating a first access count and a second access count when accessing a target region of the storage medium, wherein the first access count corresponds to a plurality of first unit regions which include the target region and correspond to a common hash value based on a hash function, and the second access count corresponds to a super block which includes the target region and second unit regions of the respective nonvolatile memory apparatuses.

In an embodiment, a method for operating a data storage device may include accessing a target region of a storage medium including a plurality of nonvolatile memory apparatuses, updating a first access count corresponding to a first group including the target region among first groups into which regions of a first unit are grouped in the storage medium, and updating a second access count corresponding to a second group including the target region among second groups into which regions of a second unit are grouped in the storage medium.

DETAILED DESCRIPTION

Figure 1:
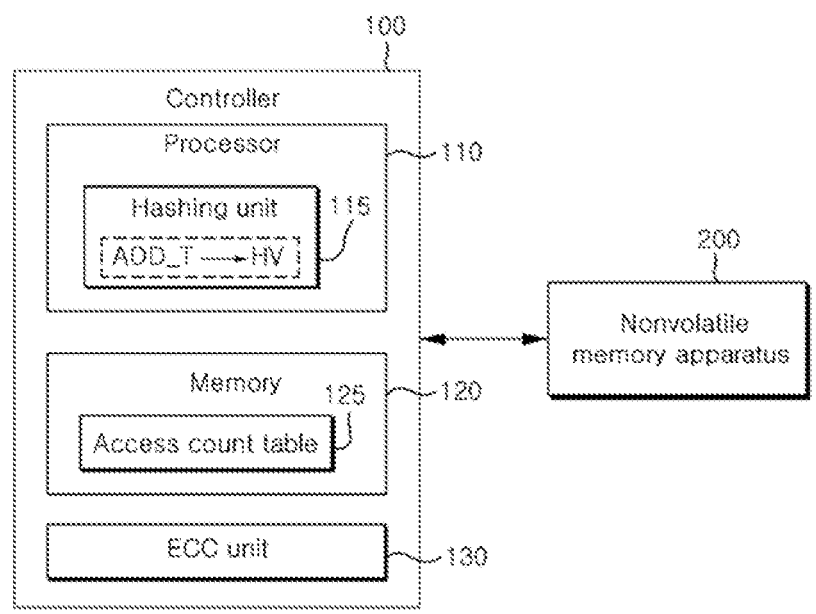
FIG. 1 is a block diagram illustrating a data storage device in accordance with the first embodiment.

Hereinafter, a data storage device and an operating method thereof will be described below with reference to the accompanying drawings through various embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale and, in some instances, proportions may have been exaggerated in order to clearly depict certain features of the invention. While particular terminology is used, it is to be appreciated that the terminology is for describing particular embodiments only and is not intended to limit the scope of the present invention.

FIG. 1 is a block diagram illustrating a data storage device 10 in accordance with the first embodiment.

The data storage device 10 may store the data provided from an external device (not shown), in response to a write request from the external device. Also, the data storage device 10 may provide stored data to the external device, in response to a read request from the external device. The data storage device 10 may be configured as a personal computer memory card international association (PCMCIA) card, a compact flash (CF) card, a smart media card, a memory stick, a multimedia card in the form of an MMC, an eMMC, an RS-MMC and an MMC-micro, a secure digital card in the form of an SD a mini-SD and a micro-SD, a universal flash storage (UFS), or a solid state drive (SSD).

The data storage device 10 may include a controller 100 and a nonvolatile memory apparatus 200.

The controller 100 may include a processor 110, a memory 120, and an ECC (error correction code) unit 130.

The processor 110 may control the general operations of the data storage device 10. The processor 110 may generate an access command for accessing a target region of the nonvolatile memory apparatus 200, for example, a write command or a read command, and may provide the generated access command to the nonvolatile memory apparatus 200. The processor 110 may drive a software program for controlling the operation of the data storage device 10, on the memory 120.

The processor 110 may perform a reliability maintenance operation. The reliability maintenance operation may be performed to prevent the deformation or loss of data stored in a neighboring region adjacent to a certain region of the nonvolatile memory apparatus 200, which is excessively accessed. The reliability maintenance operation may be performed through a data inspection operation based on an access count table 125. The processor 110 may perform the reliability maintenance operation, for example, each time the nonvolatile memory apparatus 200 is accessed through a read command.

The processor 110 may manage the access count table 125 on the memory 120. The access count table 125 may include one or more values of access counts each of which represents how many times a corresponding region of the nonvolatile memory apparatus 200 is accessed. Each time a target region of the nonvolatile memory apparatus 200 is accessed, the processor 110 may calculate a hash value HV corresponding to the target region of the nonvolatile memory apparatus 200, and may update an access count that is indexed by the calculated hash value HV, in the access count table 125.

The processor 110 may include a hashing unit 115. The hashing unit 115 may calculate the hash value HV corresponding to the target region, based on an address ADD_T of the target region. The hashing unit 115 may map the address ADD_T of the target region into the hash value HV based on a hash function. For instance, the hashing unit 115 may be realized as hardware such as a digital circuit, an analog circuit or a combination of digital and analog circuits. In other examples, the hashing unit 115 may be realized as software such as firmware, or the hashing unit 115 may be realized as a combination of hardware and software.

In order to efficiently use the capacity of the memory 120, the processor 110 may manage the access counts of the plurality of regions of the nonvolatile memory apparatus 200 in an integrated way through a single value of a common access count. The processor 110 may update the single value of the common access count when any one of the plurality of regions is accessed under the integrated management. That is to say, the common access count for the plurality of regions under the integrated management may be the sum of the access counts of the plurality of regions.

The processor 110 may manage the plurality of regions in the integrated way through a common hash value. Under the integrated management, the hashing unit 115 may map the addresses of the plurality of regions into a common hash value based on a hash function. The common access count for the plurality of regions may be indexed by the common hash value. In summary, when any one of the plurality of regions is accessed under the integrated management, the processor 110 may calculate the common hash value corresponding to the plurality of regions based on the address of the accessed region and may update the common access count that is indexed by the calculated common hash value.

The plurality of regions under the integrated management may correspond to different word lines. The plurality of regions under the integrated management may be a plurality of pages.

When it is determined based on the access count table 125 that a certain region of the nonvolatile memory apparatus 200 is excessively accessed, the processor 110 may perform the data inspection operation on the neighboring region of the certain region. The data inspection operation may be performed by checking the deformation degree of the data stored in the neighboring region and by selectively performing a reclaim operation for recovering the data to a state before the deformation, based on the deformation degree of the data.

The memory 120 may serve as a working memory a buffer memory or a cache memory. The memory 120 may store a software program or various program data to be driven by the processor 110, buffer data to be transmitted between the external device and the nonvolatile memory apparatus 200, or temporarily store cache data.

The memory 120 may store the access count table 125 that is managed by the processor 110. As described above, in the case where the processor 110 manages in the integrated way the plural access counts of the plurality of regions of the nonvolatile memory apparatus 200 through the common access count, the memory 120 may be efficiently used. If the processor 110 does not manage the plural access counts of the plurality of regions in the integrated way, and manages each of the plural access counts of the plurality of regions, the plural access counts of the plurality of regions will occupy the memory 120 proportionally to the number of regions. The access count table 125 may be backed up in the nonvolatile memory apparatus 200.

The ECC unit 130 may ECC-encode data to be written in the nonvolatile memory apparatus 200 for error detection, as well as error correction, for the data read from the nonvolatile memory apparatus 200. For example, the ECC unit 130 may generate parity data for data to be written in the nonvolatile memory apparatus 200, and may encode the data by adding the generated parity data to the data.

The ECC unit 130 may ECC-decode the read data from the nonvolatile memory apparatus 200, that is, may perform the error detection and the error correction for the read data. For example, the ECC unit 130 may perform the ECC-decoding operation by detecting an error that has occurred in the read data and correcting the detected error through the parity data included in the read data.

When the data inspection operation is performed for the neighboring region of the certain region which is excessively accessed, the ECC unit 130 may check the deformation degree of the data read from the neighboring region. For example, the ECC unit 130 may check an error occurrence rate by detecting errors that have occurred in the data read from the neighboring region. The ECC unit 130 may report the error occurrence rate of the data read from the neighboring region to the processor 110 such that the processor 110 may determine whether it is necessary to perform the reclaim operation for recovering the data stored in the neighboring region to a state before deformation.

The nonvolatile memory apparatus 200 may store data under the control of the controller 100. The nonvolatile memory apparatus 200 may access a target region corresponding to an access command.

Figure 2:
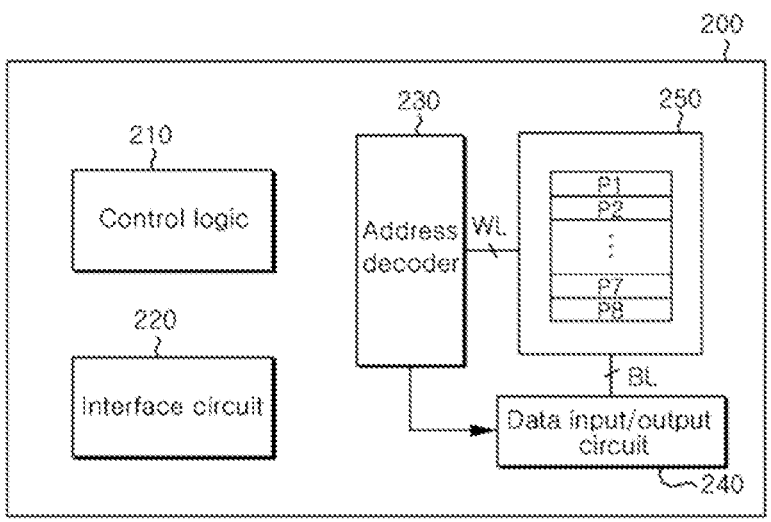
FIG. 2 is a block diagram illustrating a nonvolatile memory apparatus shown in FIG. 1.

FIG. 2 is a block diagram illustrating the nonvolatile memory apparatus 200 shown in FIG. 1.

The nonvolatile memory apparatus 200 may include a control logic 210, an interface circuit 220, an address decoder 230, a data input/output circuit 240, and a memory cell array 250.

The control logic 210 may control the general operations of the nonvolatile memory apparatus 200. The control logic 210 may control a write, read or erase operation for the memory cell array 250, in response to an access command provided from the controller 100, for example, a write, read or erase command.

The interface circuit 220 may exchange various control signals including access commands and data, with the controller 100. The interface circuit 220 may transmit various control signals and data which are inputted thereto, to the internal units of the nonvolatile memory apparatus 200.

The address decoder 230 may decode the row address and the column address included in an access command. The address decoder 230 may control word lines WL to be selectively driven based on a decoding result of the row address. The address decoder 230 may control the data input/output circuit 240 to selectively drive bit lines BL based on a decoding result of the column address.

The data input/output circuit 240 may transmit the data transmitted from the interface circuit 220 to the memory cell array 250 through the bit lines BL. The data input/output circuit 240 may transmit the data read from the memory cell array 250 through the bit lines BL, to the interface circuit 220.

The memory cell array 250 may include a plurality of memory cells (not shown) which are disposed at respective regions where the word lines WL and the bit line BL cross each other. The memory cells may be classified by the number of bits which are stored in each cell. For example, the memory cells may be classified into single level cells, each of which stores 1 bit, and multi-level cells, each of which stores at least 2 bits.

The memory cell array 250 may include a plurality of storage regions which are divided by an operation unit. For example, the memory cell array 250 may include first to eighth pages P1 to P8. While it is illustrated that the memory cell array 250 of FIG. 2 includes 8 pages, it is to be noted that the number of the pages included in the memory cell array 250 is not specifically limited.

A page may be a unit for a write operation or a read operation performed for the memory cell array 250. In other words, the memory cell array 250 may be accessed by pages. A page may be allocated with a corresponding address, and may be accessed by the address. A page may be accessed by driving a corresponding word line.

Figure 3A:
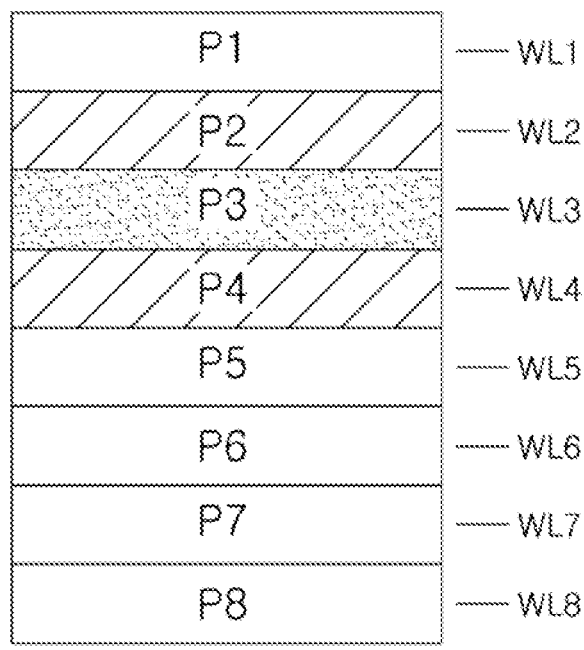
FIG. 3a is a schematic diagram illustrating the relationship between pages and word lines shown in FIG. 2.

FIG. 3a is a schematic diagram illustrating corresponding relationships between the pages P1 to P8 and the word lines WL1 to WL8 shown in FIG. 2.

Referring to FIG. 3a, a single word line may correspond to a single page. The first to eighth pages P1 to P8 included in the memory cell array 250 may respectively correspond to first to eighth word lines WL1 to WL8. When 1 word line corresponds to 1 page, the memory cells electrically coupled to a word line may be single level cells.

As described above, in the reliability maintenance operation, the access count corresponding to the target region may be updated, and the data inspection operation may be performed for the neighboring region. The target region and the neighboring region may correspond to word lines adjacent to each other. When 1 word line corresponds to 1 page and the target region is, for example, the third page P3, the neighboring regions may be the second and fourth pages P2 and P4.

Figure 3B:
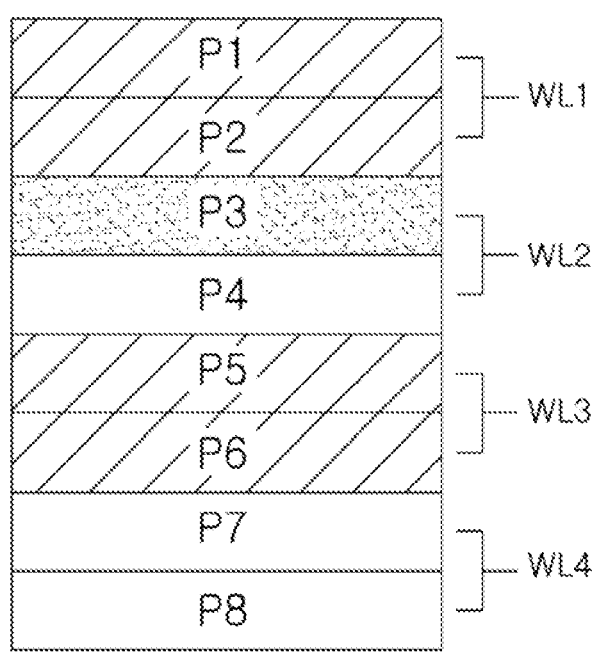
FIG. 3b is another schematic diagram illustrating the relationship between pages and word lines shown in FIG. 2.

FIG. 3b is a schematic diagram illustrating other corresponding relationships between the pages P1 to P8 and the word lines WL1 to WL8 shown in FIG. 2.

Referring to FIG. 3b, a single word line may correspond to two pages. The first and second pages P1 and P2 included in the memory cell array 250 may correspond to a first word line WL1, and the third and fourth pages P3 and P4 may correspond to a second word line WL2, and the fifth and sixth pages P5 and P6 may correspond to a third word line WL3, and the seventh and eighth pages P7 and P8 may correspond to a fourth word line WL4. When 1 word line corresponds to 2 pages, the memory cells electrically coupled to a word line may be multi-level cells.

As described above, in the reliability maintenance operation, the access count corresponding to the target region may be updated, and the data inspection operation may be performed for the neighboring region. The target region and the neighboring region may correspond to adjacent word lines. When a single word line corresponds to 2 pages and the target region is, for example, the third page P3, the neighboring regions may be the first, second, fifth and sixth pages P1, P2, P5 and P6.

Figure 4:
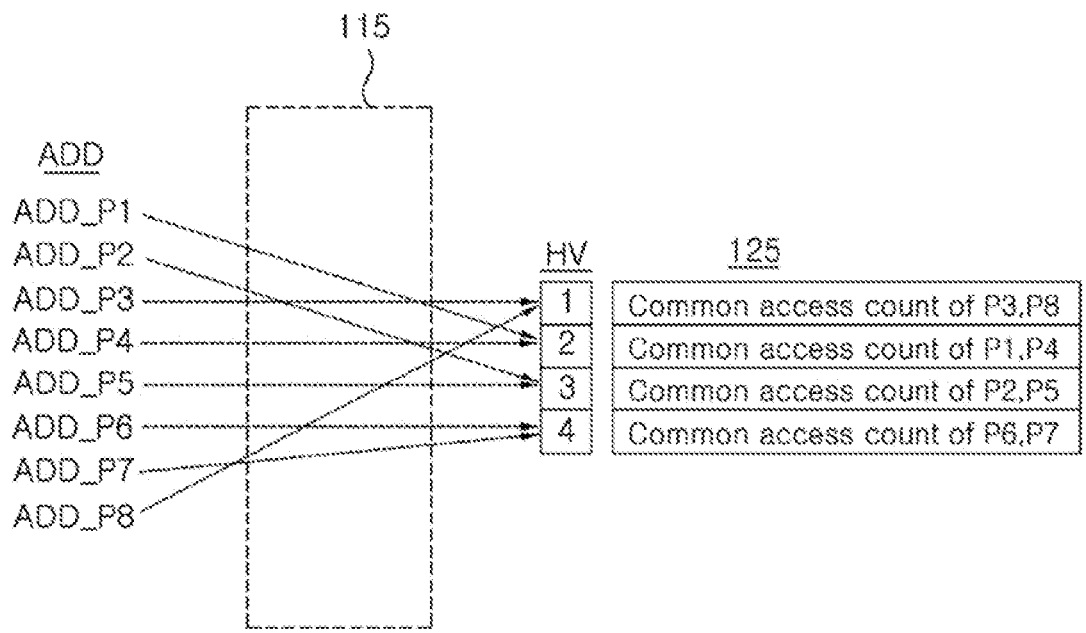
FIG. 4 is a schematic diagram illustrating an operating method of a hashing unit shown in FIG. 1.

FIG. 4 is a schematic diagram illustrating an operating method of the hashing unit 115 shown in FIG. 1 to calculate the hash values HV corresponding to the target regions accessed by access commands. Referring to FIG. 4, the access count table 125 indexed by the hash values HV is also shown.

The hashing unit 115 may calculate the hash values HV that correspond to the first to eighth pages P1 to P8 of FIG. 2. The hashing unit 115 may map the addresses ADD of the first to eighth pages P1 to P8 into a corresponding one of the hash values HV based on a hash function. For example, when the first page P1 is accessed as the target region by the access command, the hashing unit 115 may map the address ADD_P1 of the first page P1 into the common hash value '2'.

As described above, the processor 110 may manage the access counts of a plurality of pages in the integrated way, and to this end, the hashing unit 115 may map the addresses of the plurality of pages into the common hash value. The plurality of pages to be mapped into the common hash value may be determined by a hash function.

When any one of a plurality of pages, the access counts of which are managed in the integrated way, is accessed, the hashing unit 115 may calculate the common hash value of the pages. The calculated common hash value may be the index value of the common access count that is managed in the integrated way for the plurality of pages.

Referring to FIG. 4, the hashing unit 115 may map, for example, the addresses ADD_P3 and ADD_P8 of the third and eighth pages P3 and P8, into the common hash value '1'. When any one of the third and eighth pages P3 and P8 is accessed, the hashing unit 115 may calculate the common hash value '1'. Such hashing will cause the processor 110 to manage in the integrated way the access counts of the third and eighth pages P3 and P8 by indexing them to the common hash value '1'.

While it is illustrated in FIG. 4 that the hash unit 115 maps the addresses of 2 pages into a common hash value, it is to be noted that the number of pages which are to be mapped into a common hash value is not specifically limited. In the embodiments, the number of pages, the access counts of which are managed in the integrated way, is not specifically limited.

Figure 5:
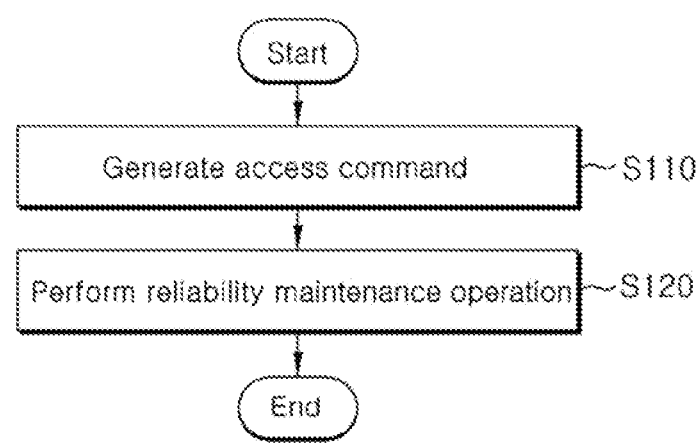
FIG. 5 is a flow chart illustrating an operating method of a data storage device shown in FIG. 1.

FIG. 5 is a flow chart illustrating an operating method of the data storage device 10 shown in FIG. 1.

In step S110, the processor 110 may generate the access command for accessing the target region. For example, the processor 110 may generate a read command for reading data from the target region. The nonvolatile memory apparatus 200 will access the target region in response to the access command provided from the processor 110.

In step S120, the processor 110 may perform reliability maintenance operations. The reliability maintenance operation may be performed by the data inspection operation based on the access count table 125.

The processor 110 may perform the reliability maintenance operation each time the nonvolatile memory apparatus 200 is accessed. The processor 110 may perform the reliability maintenance operation each time the nonvolatile memory apparatus 200 is accessed, for example, through the read command.

Figure 6:
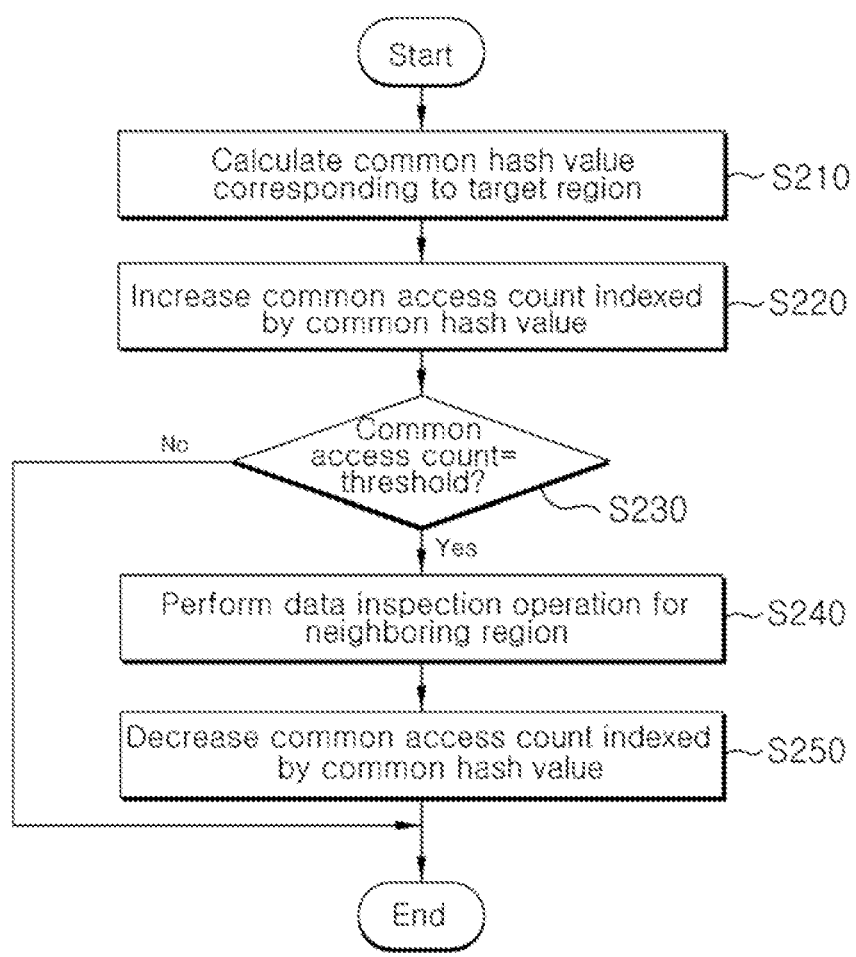
FIG. 6 is a flow chart illustrating a method for a reliability maintenance operation of a processor shown in FIG. 1.

FIG. 6 is a flow chart illustrating a method for a reliability maintenance operation of the processor 110 shown in FIG. 1. The method for the reliability maintenance operation of the processor 110 shown in FIG. 6 may correspond to step S120 of FIG. 5. It is described as an example that the processor 110 has generated the access command for accessing the target region.

In step S210, the hashing unit 115 may calculate the common hash value corresponding to the target region. The hashing unit 115 may map the address of the target region into a corresponding one of the hash values based on a hash function.

In step S220, the processor 110 may increase the common access count that is indexed by the calculated common hash value.

In step S230, the processor 110 may determine whether the updated common access count reaches a threshold. When it is determined that the updated common access count reaches the threshold (Yes), the process may proceed to step S240. When it is determined that the updated common access count does not reach the threshold (No), the process may be ended. Namely, when the updated common access count does not reach the threshold, it implies that the target region has not been excessively accessed, and thus the processor 110 may end the reliability maintenance operation.

In step S240, the processor 110 may perform the data inspection operation for the neighboring region adjacent to the target region. The data inspection operation may be performed by checking the deformation degree of the data stored in the neighboring region and by selectively performing the reclaim operation for recovering the data to a state before deformation based on the deformation degree of the data.

In step S250, the processor 110 may decrease the common access count that is indexed by the common hash value calculated in step S210. Since the data stored in the neighboring region are inspected through the data inspection operation in step S240, the processor 110 may decrease the common access count that corresponds to the target region in order to delay a subsequent data inspection operation for the neighboring region.

As described above, the processor 110 may manage the common access counts of a plurality of regions including the target region under the integrated management. In this case, the common access count that is increased in step S220 may also be increased by accesses to regions other than the target region among the plurality of regions under the integrated management. Even though the common access count reaches the threshold by the access to the target region, such a result may occur even by excessive accesses to other regions than the target region under the integrated management. Therefore, as the processor 110 does not completely reset the common access count corresponding to the target region but decreases the common access count to a predetermined value, the management of excessive accesses to other regions than the target region under the integrated management may also be maintained to some extent.

Figure 7:
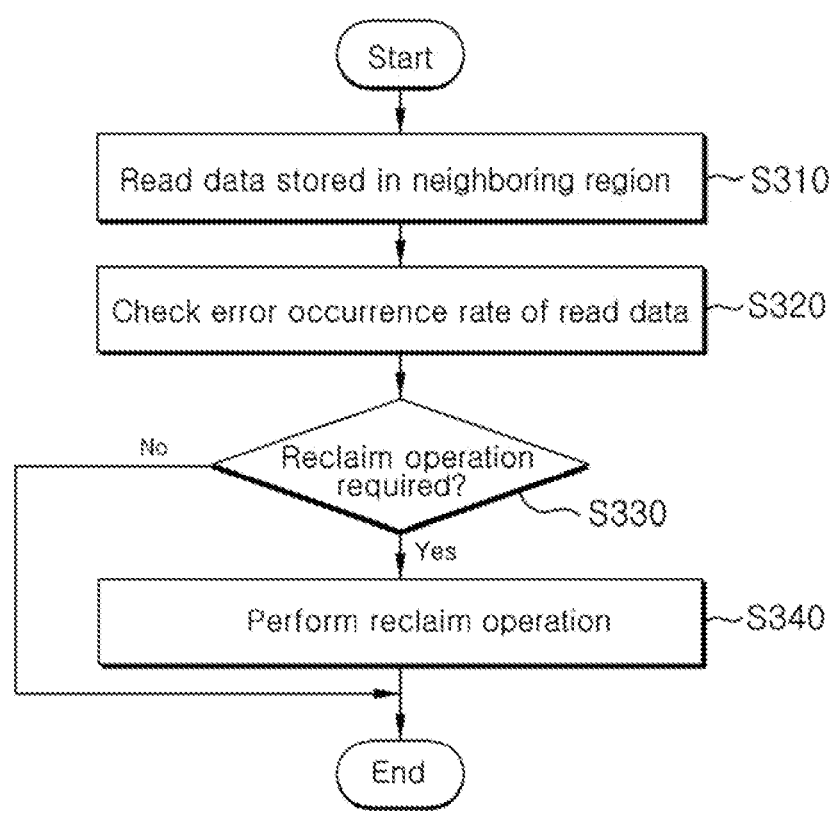
FIG. 7 is a flow chart illustrating a method for a data inspection operation of a processor shown in FIG. 1.

FIG. 7 is a flow chart illustrating a method for a data inspection operation of the processor 110 shown in FIG. 1. The method for the data inspection operation of the processor 110 shown in FIG. 7 may correspond to step S240 of FIG. 6.

In step S310, the processor 110 may read the data stored in the neighboring region adjacent to the target region.

In step S320, the ECC unit 130 may check the error occurrence rate of the data read from the neighboring region. The ECC unit 130 may report the error occurrence rate to the processor 110 such that the processor 110 may determine whether it is necessary to perform the reclaim operation for the neighboring region.

In step S330, the processor 110 may determine whether it is necessary to perform the reclaim operation for the neighboring region based on the error occurrence rate of the read data. For example, the processor 110 may compare the error occurrence rate and a threshold, and determine that it is necessary to perform the reclaim operation when the error occurrence rate exceeds the threshold. When it is determined that it is necessary to perform the reclaim operation (Yes), the process may proceed to step S340. When it is determined that it is not necessary to perform the reclaim operation (No), the process may be ended.

In step S340, the processor 110 may perform the reclaim operation for the neighboring region to recover the data stored in the neighboring region to the state before deformation. For example, the processor 110 may perform the reclaim operation through a garbage collecting operation. The processor 110 may recover the data stored in the neighboring region to the state before deformation by re-storing the data stored in the neighboring region into another region.

Figure 8:
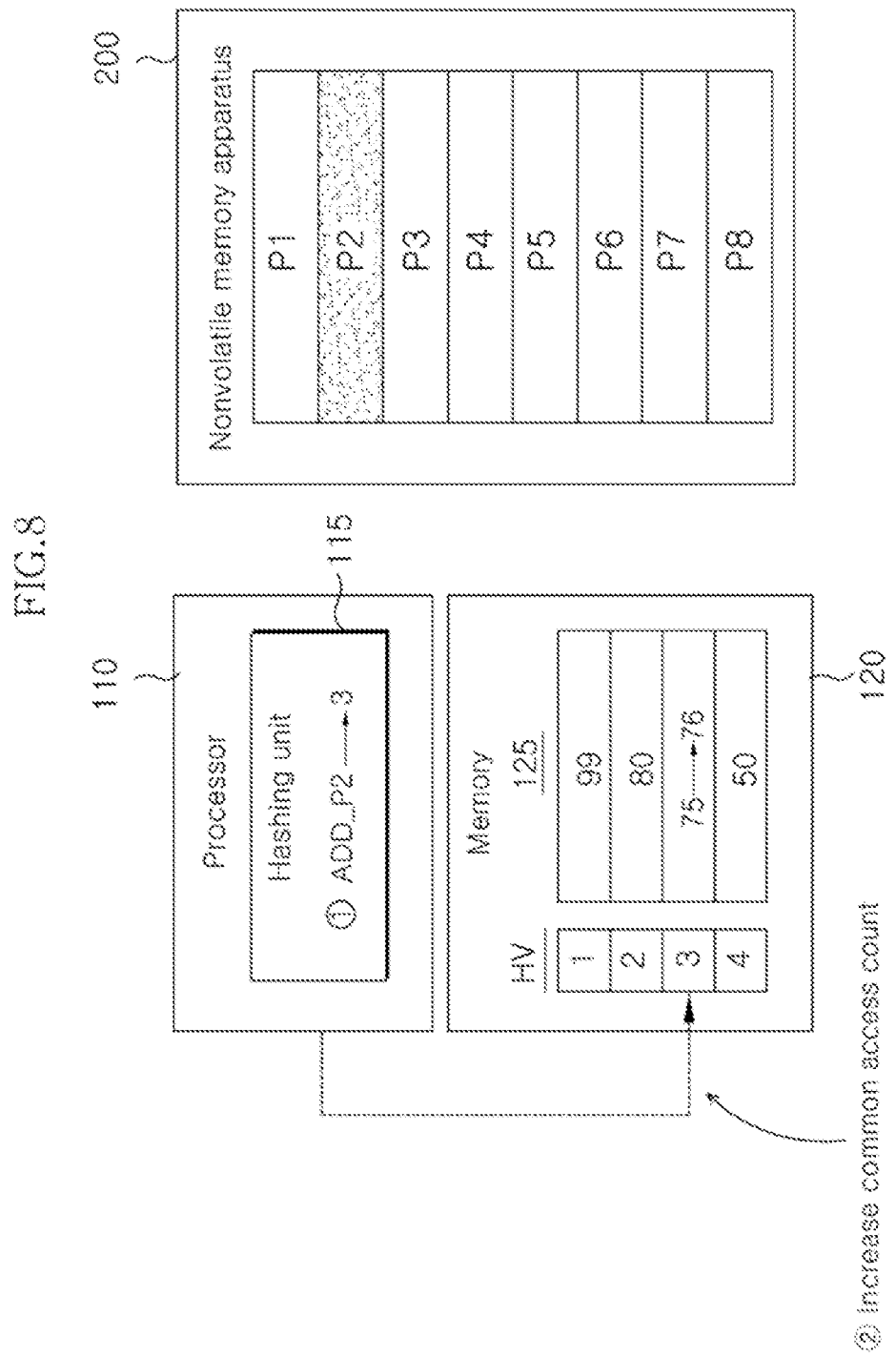
FIGS. 8 and 9 are schematic diagrams illustrating a method for a reliability maintenance operation of a processor shown in FIG. 1.
Figure 9:
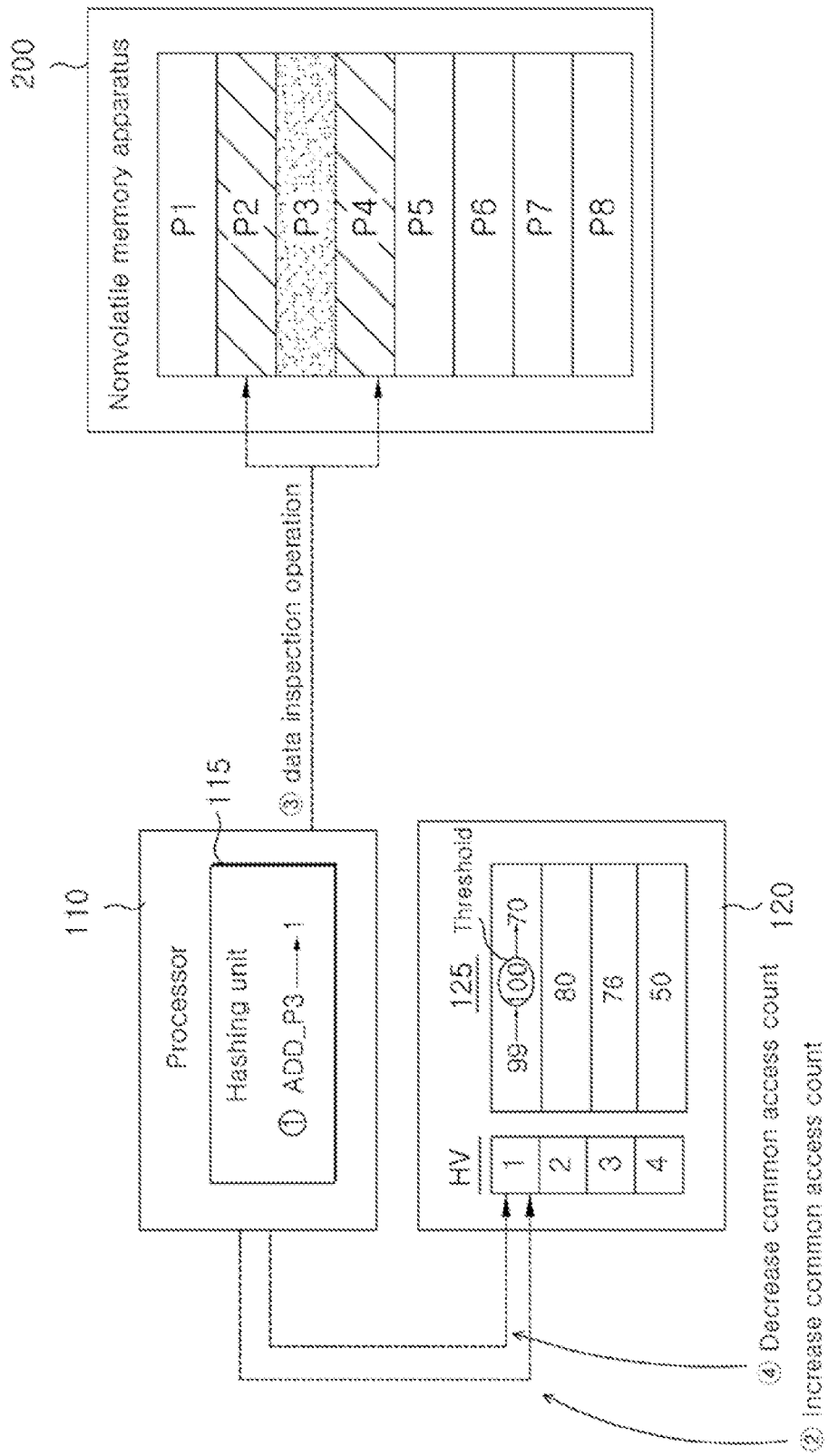

FIGS. 8 and 9 are schematic diagrams illustrating a method for a reliability maintenance operation of the processor 110 shown in FIG. 1. FIG. 8 shows the method for the reliability maintenance operation of the processor 110 when the processor 110 determines that the updated common access count does not reach the threshold (No) in step 230 of FIG. 6. FIG. 9 shows the method for the reliability maintenance operation of the processor 110 when the processor 110 determines that the updated common access count reaches the threshold (Yes) in step 230 of FIG. 6. It is described as an example that the processor 110 performs the reliability maintenance operation each time the nonvolatile memory apparatus 200 is accessed through a read command, to prevent the deformation or loss of data by a read disturbance effect exerted on the neighboring region by the target region.

Hereinafter, the method for the processor 110 performing the reliability maintenance operation will be described in detail with reference to FIGS. 4, 6 and 8. It is described as an example that the processor 110 has generated a read command for the target region, for example, the second page P2, and has read the second page P2.

The hashing unit 115 may calculate the common hash value HV corresponding to the second page P2 (①). The hashing unit 115 may map the address ADD_P2 of the second page P2 into the common hash value '3' based on the hash function according to the calculation method shown in FIG. 4.

The processor 110 may increase the common access count that is indexed by the common hash value '3' in the access count table 125 on the memory 120 (②).

The processor 110 may determine whether the updated common access count reaches the threshold. When the threshold is set to 100, the processor 110 may determine that the updated common access count does not reach the threshold since it is still 76. The processor 110 may end the reliability maintenance operation.

Next, another method for the processor 110 to perform the reliability maintenance operation will be described in detail with reference to FIGS. 4, 6 and 9. It is described as an example that the processor 110 has generated a read command for the target region, for example, the third page P3, and has read the third page P3.

The hashing unit 115 may calculate the common hash value HV corresponding to the third page P3 (①). The hashing unit 115 may map the address ADD_P3 of the third page P3 into the common hash value '1' based on the hash function according to the calculation method shown in FIG. 4.

The processor 110 may increase the common access count that is indexed by the common hash value '1' in the access count table 125 on the memory 120 (②).

The processor 110 may determine whether the updated common access count reaches the threshold. When the threshold is set to 100, the processor 110 may determine that the updated common access count has reached the threshold since it is 100.

The processor 110 may perform the data inspection operation for the neighboring regions (③). When a single word line corresponds to a single page, as shown in FIG. 3a, the processor 110 may perform the data inspection operation for the second and fourth pages P2 and P4. Although not illustrated, when a single word line corresponds to 2 pages, the processor 110 may perform the data inspection operation for the first, second, fifth and sixth pages P1, P2, P5 and P6, which are the neighboring regions of the target region or the third page P3.

After performing the data inspection operation for the neighboring regions, the processor 110 may decrease the common access count that is indexed by the common hash value '1' in the access count table 125 (④). Since the data stored in the second and fourth pages P2 and P4 are inspected through the data inspection operation, the processor 110 may decrease the common access count to delay a subsequent data inspection operation for the second and fourth pages P2 and P4. However, since the common access count indexed by the common hash value '1' corresponds to both of the third and eighth pages P3 and P8 under the integrated management, as shown in FIG. 4, the processor 110 may decrease the common access count indexed by the common hash value '1' to a predetermined value, for example, 70. That is to say, the processor 110 may not completely reset the common access count indexed by the common hash value '1' in order to maintain management of excessive accesses to the eighth page P8 other than the third page P3 under the integrated management.

Figure 10:
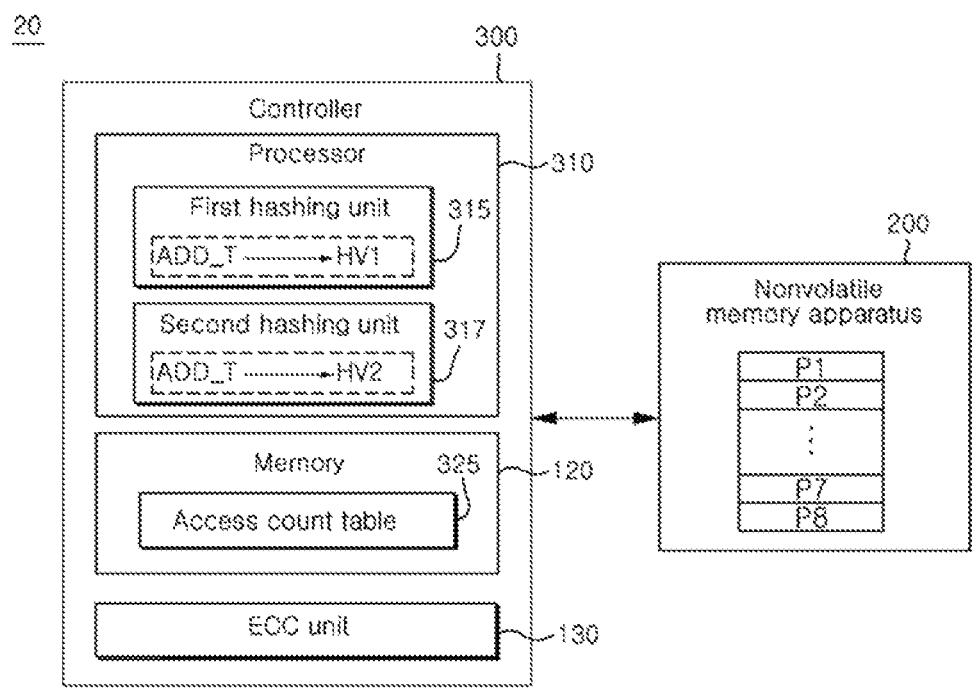
FIG. 10 is a block diagram illustrating a data storage device in accordance with the second embodiment.

FIG. 10 is a block diagram illustrating a data storage device 20 in accordance with the second embodiment. In FIG. 10, the same reference numerals as in FIG. 1 will be used for substantially the same elements as the data storage device 10 described above with reference to FIG. 1, and detailed descriptions for the corresponding elements will be omitted.

The data storage device 20 may be the same as the data storage device 10 described with reference to FIG. 1 except that the controller 300 includes a first hashing unit 315 and a second hashing unit 317.

A processor 310 may manage an access count table 325. The processor 310 may calculate a plurality of common hash values corresponding to the target region of the nonvolatile memory apparatus 200, for example, a first common hash value HV1 and a second common hash value HV2, each time the nonvolatile memory apparatus 200 is accessed through an access command, and may update both of the common access counts that are indexed by the first and second common hash values HV1 and HV2, respectively, in the access count table 325.

The processor 310 may include the first hashing unit 315 and the second hashing unit 317. Each of the first hashing unit 315 and the second hashing unit 317 may be the same as the hashing unit 115 described with reference to FIGS. 1 to 9. The first hashing unit 315 and the second hashing unit 317 may calculate different common hash values corresponding to the target region. The first hashing unit 315 may map the address ADD_T of the target region into the first common hash value HV1 based on a first hash function. The second hashing unit 317 may map the address ADD_T of the target region into the second common hash value HV2 based on a second hash function.

While it is shown in FIG. 10 that the processor 310 includes 2 hashing units, it is to be noted that the number of hashing units to be included in the processor 310 is not specifically limited. According to an embodiment, different hash values corresponding to a target region may be calculated by the number of the hashing units included in the processor 310, and the processor 310 may update all access counts that are indexed by the calculated hash values.

Figure 11:
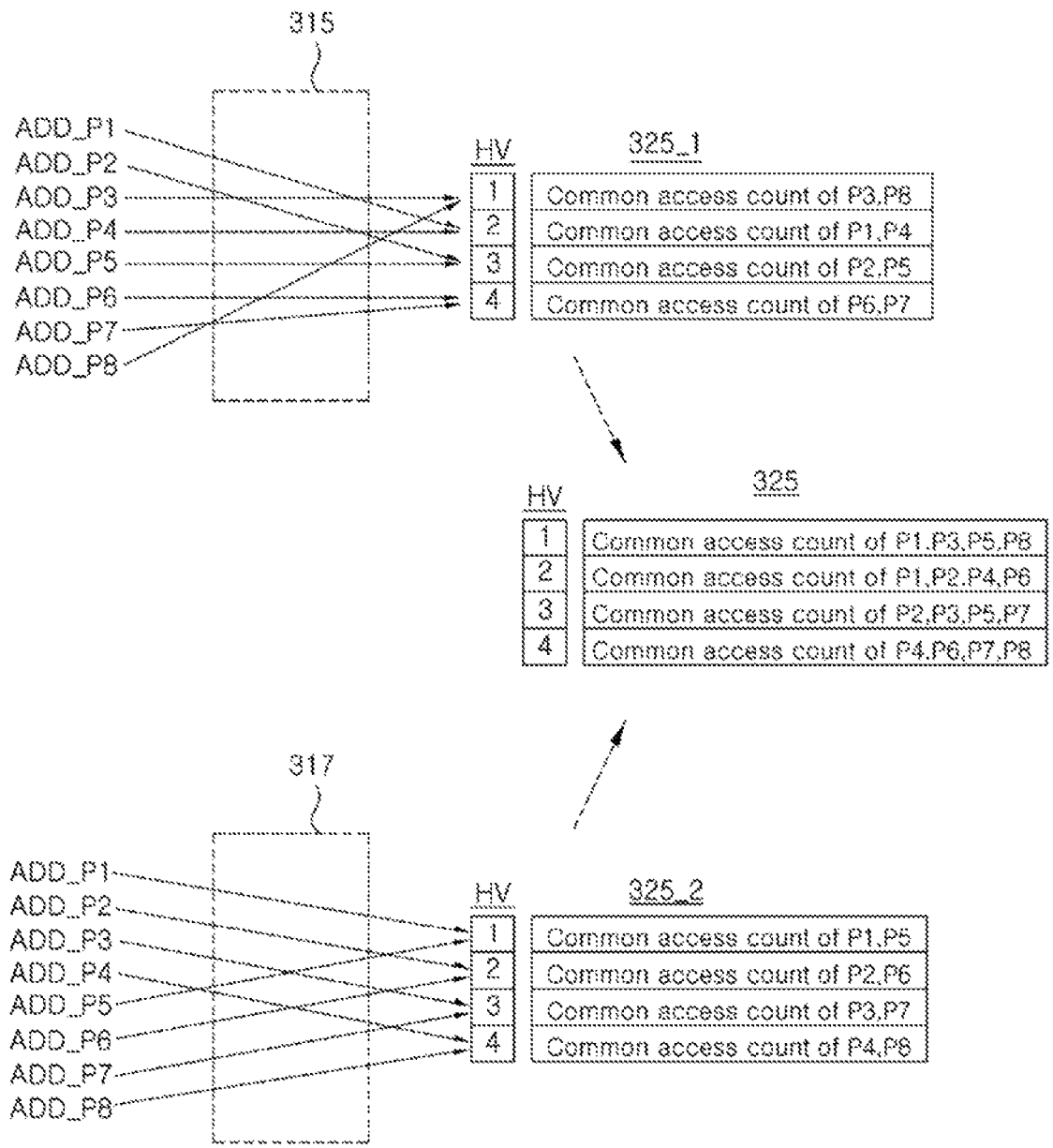
FIG. 11 is a schematic diagram illustrating an operating method of first and second hashing units shown in FIG. 10.

FIG. 11 is a schematic diagram illustrating an operating method of first and second hashing units 315 and 317 shown in FIG. 10 to calculate different hash values HV, that is, the first common hash values HV1 and the second common hash values HV2 corresponding to a single target region accessed by the access command. Referring to FIG. 11, the access count table 325 indexed by the hash values HV is also shown.

The first hashing unit 315 and the second hashing unit 317 may calculate the first common hash values HV1 and the second common hash values HV2 corresponding to first to eighth pages P1 to P8. The first hashing unit 315 may map addresses ADD of the first to eighth pages P1 to P8 into a corresponding one of the first common hash values HV1 based on the first hash function. The second hashing unit 317 may map the addresses ADD of the first to eighth pages P1 to P8 into a corresponding one of the second common hash values HV2 based on the second hash function. For example, when the third page P3 is accessed as target region by the access command, the first hashing unit 315 may map the address ADD_P3 of the third page P3 into the first common hash value '1', and the second hashing unit 317 may map the address ADD_P3 of the third page P3 into the second common hash value '3'.

When the processor 310 calculates only the first common hash values HV1 by the first hashing unit 31, processor 310 will manage a first access count sub-table 325_1 that is indexed by the first common hash values HV1. Similarly, when the processor 310 calculates only the second common hash values HV2 by the second hashing unit 317, the processor 310 will manage a second access count sub-table 325_2 that is indexed by the second common hash values HV2. As the processor 310 calculates the first common hash values HV1 and the second common hash values HV2 by the first hashing unit 315 and the second hashing unit 317, the processor 310 may manage the access count table 325 in which the first access count sub-table 325_1 and the second access count sub-table 325_2 are integrated. For example, the first common hash value '1' in the first access count sub-table 325_1 may index the common access count for both of the third and eighth pages P3 and P8, and the second common hash value '1' in the second access count sub-table 325_2 may index the common access count for both of the first and fifth pages P1 and P5. Therefore, the common hash value '1' in the access count table 325 may index four of the first, third, fifth, and eighth pages P1, P3, P5, and P8.

Figure 12:
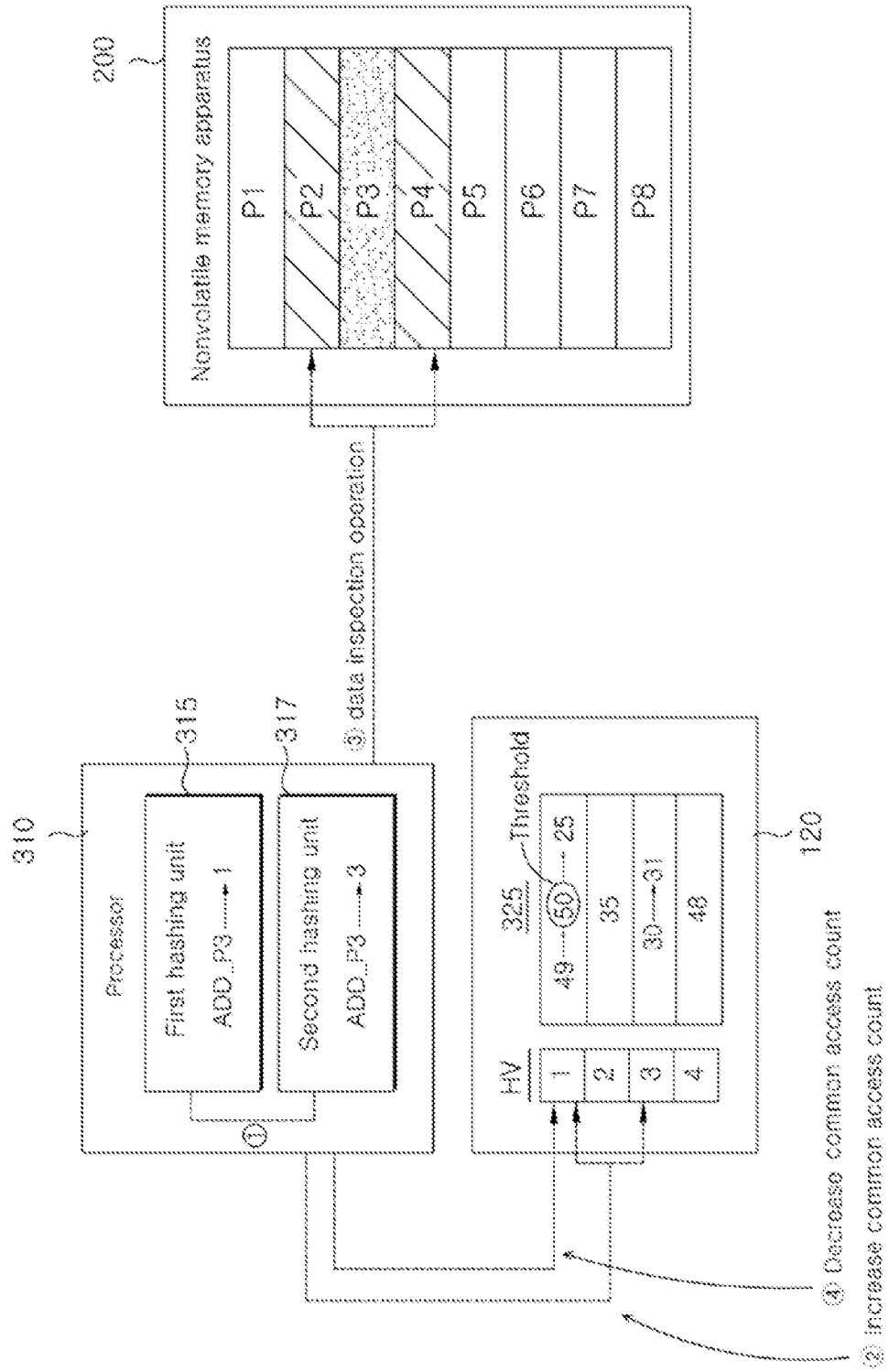
FIG. 12 is a schematic diagram illustrating a method for a reliability maintenance operation of a processor shown in FIG. 10.

FIG. 12 is a schematic diagram illustrating a method for a reliability maintenance operation of the processor 310 shown in FIG. 10. It is described as an example that the processor 310 performs the reliability maintenance operation each time an the nonvolatile memory apparatus 200 is accessed through a read command, to prevent the deformation or loss of data by the read disturbance effect exerted on the neighboring region by the target region.

Hereinafter, the method for the processor 310 performing the reliability maintenance operation will be described in detail with reference to FIGS. 10 to 12. It is described as an example that the processor 310 generates a read command for the target region, for example, a third page P3, and reads the third page P3.

The first hashing unit 315 and the second hashing unit 317 may respectively calculate the first common hash value HV1 and the second common hash value HV2 corresponding to the third page P3 (①). The first hashing unit 315 may map the address ADD_P3 of the third page P3 into the first common hash value '1' based on the first hash function according to the calculation method shown in FIG. 11. The second hashing unit 317 may map the address ADD_P3 of the third page P3 into the second common hash value '3' based on the second hash function according to the calculation method shown in FIG. 11.

The processor 310 may increase the common access count indexed by the calculated first common hash value '1' from 49 to 50 and increase the common access count indexed by the calculated second common hash value '3' from 30 to 31, in the access count table 325 on the memory 120 (②).

The processor 310 may determine whether one or more of the updated common access counts reach the threshold. When the threshold is set to 50, the processor 310 may determine that the common access count indexed by the first common hash value '1' has reached the threshold.

The processor 310 may perform the data inspection operation for the neighboring regions (③). When a single page corresponds to a single word line, the processor 310 may perform the data inspection operation for the second and fourth pages P2 and P4. Although not illustrated, when a single word line corresponds to 2 pages, the processor 310 may perform the data inspection operation for the first, second, fifth and sixth pages P1, P2, P5 and P6, which are the neighboring regions of the target region or the third page P3.

After performing the data inspection operation for the neighboring regions, the processor 310 may decrease the common access count indexed by the first common hash value '1' in the access count table 325 (④). Since the data stored in the second and fourth pages P2 and P4 are inspected through the data inspection operation, the processor 310 may decrease the common access count to delay a subsequent data inspection operation for the second and fourth pages P2 and P4. However, because the common access count indexed by the first common hash value '1' corresponds to all of the first, third, fifth and eighth pages P1, P3, P5 and P8 under the integrated management, as shown in FIG. 11, the processor 310 may decrease the common access count indexed by the first common hash value '1' to a preset value, for example, 25. In other words, the processor 310 may not completely reset the common access count indexed by the first common hash value '1' in order to maintain management of excessive accesses to the first, fifth and eighth pages P1, P5 and P8, other than the third page P3, under the integrated management.

The data storage device 20 described above with reference to FIGS. 10 to 12 may be effective in the following situation. For example, it is described in FIG. 12 that the eighth page P8 has been excessively accessed before the third page P3 is accessed. The eighth page P8 may correspond to the first common hash value '1' by the first hashing unit 315, and correspond to the second common hash value '4' by the second hashing unit 317. Accordingly, the common access counts indexed by the first common hash value '1' and the second common hash value '4' in the access count table 325 may be increased close to the threshold, for example, to 49 and 48, respectively. In this state, as a result of the access to the third page P3, the common access count indexed by the first common hash value '1' in the access count table 325 may reach the threshold of 50 and then may be decreased to 25. Nevertheless, since the common access count indexed by the second common hash value '4' in the access count table 325 is maintained as it is, the data inspection operation for the neighboring regions of the eighth page P8 may be performed at an earlier time and, thus, data reliability may be improved.

Figure 13:
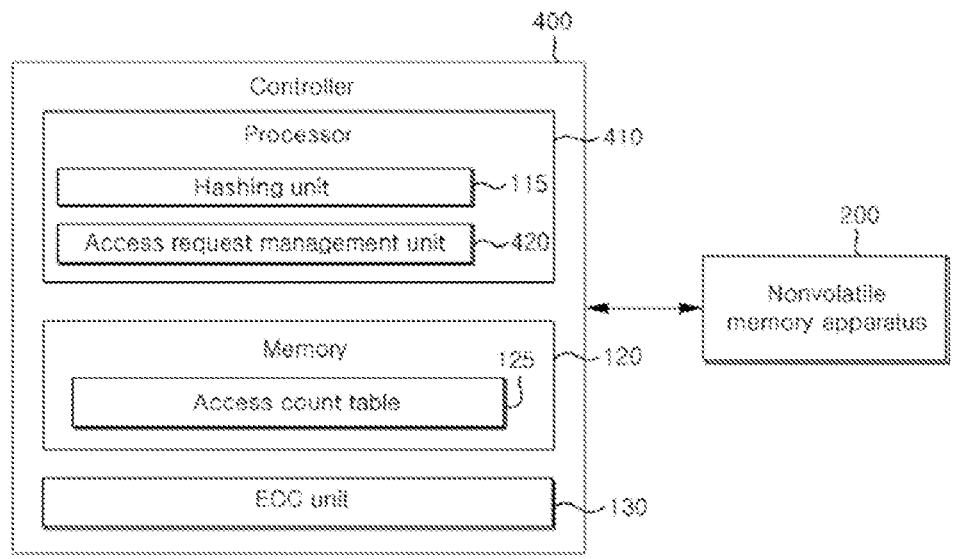
FIG. 13 is a block diagram illustrating a data storage device in accordance with the third embodiment.

FIG. 13 is a block diagram illustrating a data storage device 30 in accordance with the third embodiment. In FIG. 13, the same reference numerals as in FIG. 1 will be used for substantially the same elements as the data storage device 10 described above with reference to FIG. 1, and detailed descriptions for the corresponding elements will be omitted.

The data storage device 30 may include a controller 400 and a nonvolatile memory apparatus 200.

A processor 410 may not only update an access count corresponding to a target region of the nonvolatile memory apparatus 200 but also update an access request count, based on an access request, for example, a read request. The processor 410 may update an access request count based on an access request transmitted to the data storage device 30, without distinguishing a target region. Unlike the processor 110 of FIG. 1, the processor 410 may further include an access request management unit 420.

The access request management unit 420 may update an access request count based on an access request provided from an external device, for example, a read request. The access request management unit 420 may store an access request count in a register thereof or a memory 120.

The access request management unit 420 may increase an access request count by one or more depending on the size of access-requested data. For example, the access request management unit 420 may increase an access request count by a minimum integer N that is not smaller than the ratio of a size X of access-requested data to a maximum size Y of data by which a write operation or a read operation may be performed for the nonvolatile memory apparatus 200 at a time. A value UPDATE by which the access request management unit 420 increases an access request count may be expressed as follows.

UPDATE=$N$ where $N-1<(X/Y) \leq N$ and $N$ is an integer.

For example, if the maximum size of data by which a write operation or a read operation may be performed for the nonvolatile memory apparatus 200 at a time is 32 Kbyte, the access request management unit 420 may increase an access request count by 1 when the size of access requested data is 16 Kbyte, may increase an access request count by 2 when the size of access requested data is 64 Kbyte, and may increase an access request count by 3 when the size of access requested data is 80 Kbyte.

The processor 410 may completely reset, that is, initialize, all access counts in an access count table 125 each time an access request count reaches an initialization threshold.

The processor 410 may increase an access count corresponding to a region that is rarely accessed, and thus not significantly concerned about data deformation. The effect of such an increase may accumulate as the processor 410 repeats the process of performing a data inspection operation and then decreasing an access count by a subtraction value. The effect accumulated in this way may cause an unnecessary data inspection operation, and may deteriorate the performance of the data storage device 30. However, according to the present embodiment, since the processor 410 initializes all access counts of the access count table 125 when an access request count reaches an initialization threshold, the effect accumulated as described above may be eliminated, whereby it is possible to contribute to improving the performance of the data storage device 30.

If an access request count reaches the initialization threshold, the access request management unit 420 may initialize the access request count to 0, and may start counting again.

Figure 14:
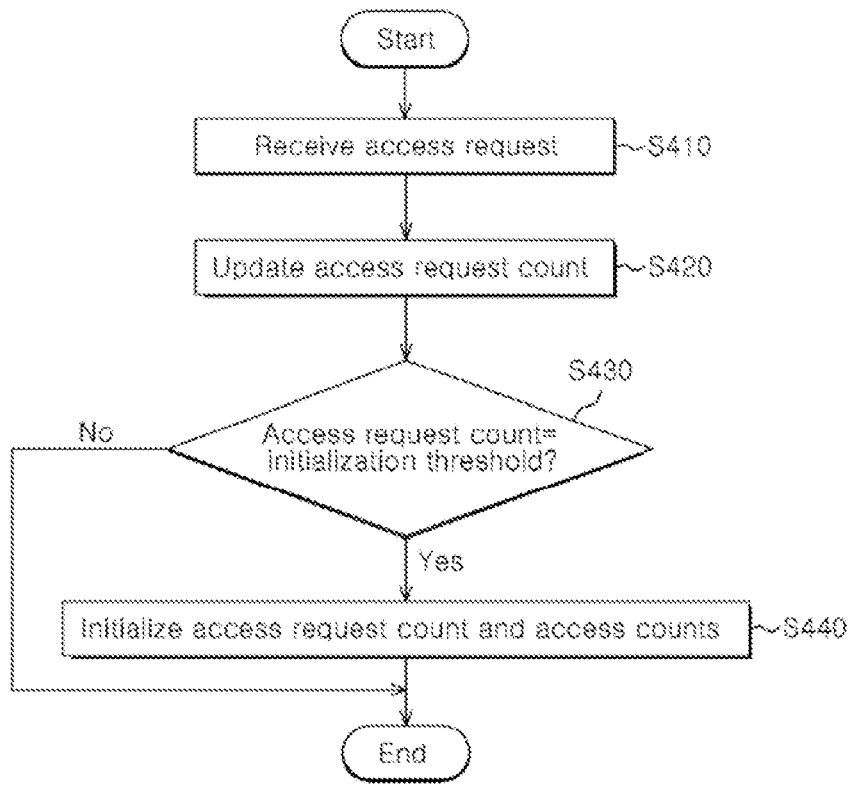
FIG. 14 is a flow chart explaining a method for initializing access counts in the access count table of the processor shown in FIG. 13.

FIG. 14 is a flow chart explaining a method for initializing access counts in the access count table 125 of the processor 410 shown in FIG. 13.

At step S410, the processor 410 may receive an access request, for example, a read request, from an external device. The processor 410 performs a reliability maintenance operation based on the access request, as shown in FIG. 6.

At step S420, the processor 410 may update an access request count based on the access request. The processor 410 may increase the access request count by one or more depending on the size of access requested data.

At step S430, the processor 410 may determine whether the access request count reaches an initialization threshold. When it is determined that the access request count reaches the initialization threshold, the process may proceed to step S440. When it is determined that the access request count does not reach the initialization threshold, the process may be ended.

At step S440, the processor 410 may initialize the access request count and all access counts of the access count table 125.

Figure 15:
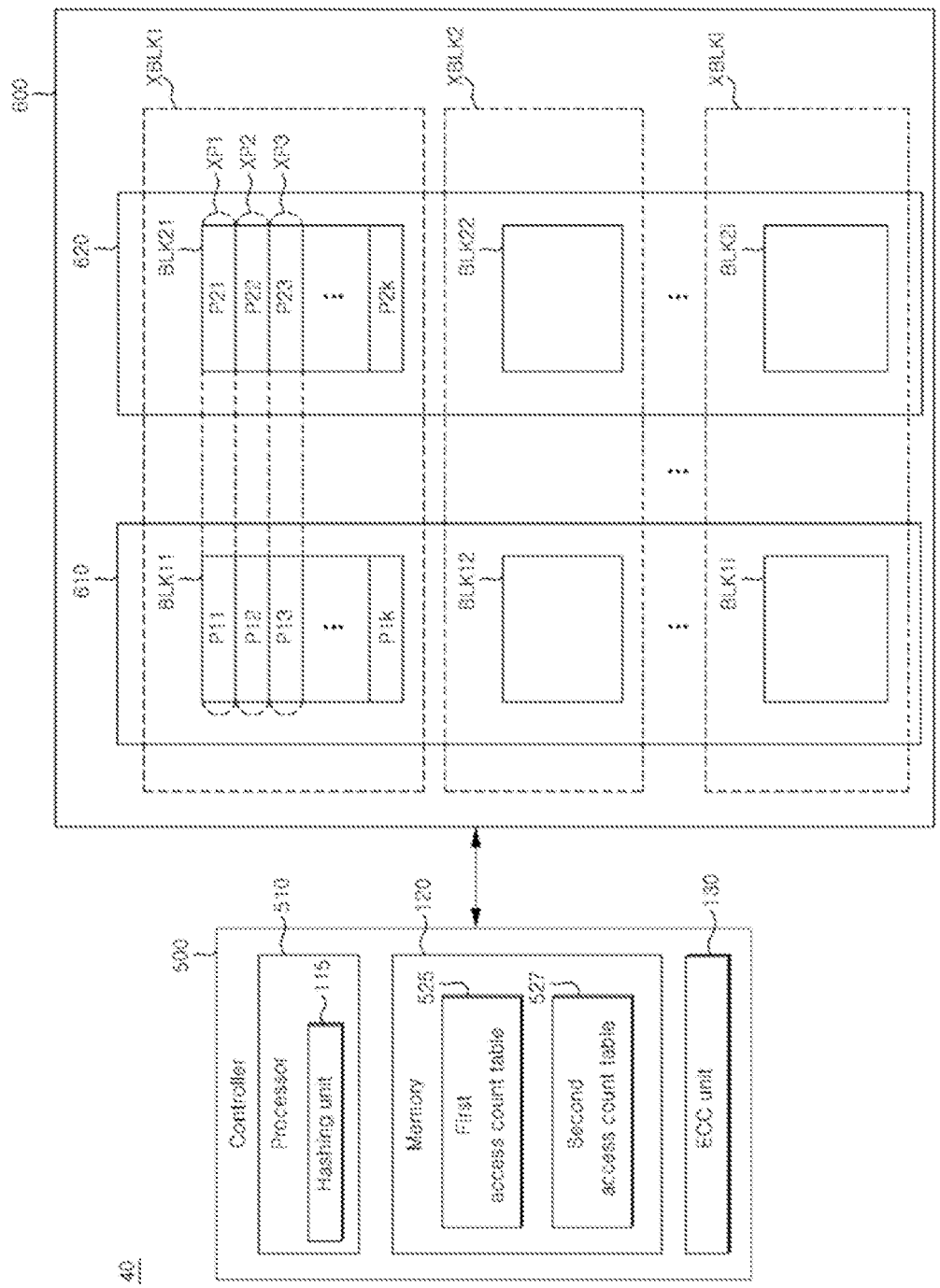
FIG. 15 is a block diagram illustrating a data storage device in accordance with the fourth embodiment.

FIG. 15 is a block diagram illustrating a data storage device 40 in accordance with the fourth embodiment. In FIG. 15, the same reference numerals as in FIG. 1 will be used for substantially the same elements as the data storage device 10 described above with reference to FIG. 1, and detailed descriptions for the corresponding elements will be omitted.

The data storage device 40 may include a controller 500 and a storage medium 600.

The storage medium 600 may include a first nonvolatile memory apparatus 610 and a second nonvolatile memory apparatus 620. For example, the first nonvolatile memory apparatus 610 may include a plurality of memory blocks BLK11 to BLK1$i$. For example, the memory block BLK11 may include a plurality of pages P11 to P1$k$. A memory block may be a unit for performing an erase operation in a nonvolatile memory apparatus. A page may be a unit for performing a write or read operation in a nonvolatile memory apparatus. While FIG. 15 illustrates that the two nonvolatile memory apparatuses 610 and 620 are included in the storage medium 600, the number of nonvolatile memory apparatuses included in the storage medium 600 is not specifically limited.

A processor 510 may manage the storage medium 600 by the unit of a super block. A super block may be formed in the first and second nonvolatile memory apparatuses 610 and 620, and may include respective memory blocks of the first and second nonvolatile memory apparatuses 610 and 620. For example, a super block XBLK1 may include the memory block BLK11 of the first nonvolatile memory apparatus 610 and a memory block BLK21 of the second nonvolatile memory apparatus 620. In one super block, pages with the same offset value may be defined as a super page. For example, in the super block XBLK1, pages P11 and P21 may be grouped into one super page XP1. In order to improve processing speed, the processor 510 may access the storage medium 600 by the unit of a super page. The first and second nonvolatile memory apparatuses 610 and 620 may perform in parallel a write operation for pages grouped into a super page, under the control of the processor 510.

When accessing a target region of the storage medium 600 and performing a reliability maintenance operation, the processor 510 may update a first access count corresponding to a first group including the target region among first groups into which regions of a first unit are grouped. The regions of the first unit may be, for example, pages P11 to P1$k$ and P21 to P2$k$. The processor 510 may manage respective access counts for a plurality of pages grouped into one first group, in an integrated way, through a first common access count corresponding to the first group. That is to say, when accessing any one among a plurality of pages grouped into a certain first group, the processor 510 may update the first common access count corresponding to the first group. The processor 510 may index first common access counts respectively corresponding to the first groups by different hash values, and manage the first common access counts as a first access count table 525. The processor 510 may manage the first access count table 525 by substantially the same method as the management method of the access count table 125 described above with reference to FIG. 1.

Further, when accessing a target region of the storage medium 600 and performing a reliability maintenance operation, the processor 510 may update a second access count corresponding to a second group including the target region among second groups into which regions of a second unit are grouped. The regions of the second unit may be, for example, memory blocks BLK11 to BLK1$i$ and BLK21 to BLK2$i$, and the second groups may be super blocks XBLK1 to XBLKi. In this case, the processor 510 may manage respective access counts of memory blocks grouped into one super block, in an integrated way, through a second common access count corresponding to the super block. That is to say, when accessing even one of the pages included in the memory blocks included in a certain super block, the processor 510 may update the second common access count corresponding to the super group. The processor 510 may index second common access counts corresponding to the super blocks XBLK1 to XBLKi by, for example, the addresses of the super blocks XBLK1 to XBLKi, and manage the second common access counts as a second access count table 527.

When both the first common access count and the second common access count corresponding to a certain target region exceed thresholds, the processor 510 may perform a data inspection operation for one or more neighboring regions adjacent to the target region. According to an embodiment, the thresholds may be set as the same value or different values for the first common access count and the second common access count. The processor 510 may perform the data inspection operation in substantially the same way as the method for performing the data inspection operation described above with reference to FIG. 7.

The second common access count may include a frequency with which sequential reading has occurred for a super page including a target region. Accordingly, a second common access count that exceeds the threshold may imply a great likelihood of deforming the data stored in neighboring super pages adjacent to the super page including the target region. The neighboring super pages may be super pages which include neighboring regions adjacent to the target region. In consideration of these facts, according to an embodiment, when both the first common access count and the second common access count corresponding to a certain target region exceed thresholds, the processor 510 may perform a data inspection operation for reliability risk regions including one or more neighboring regions adjacent to the target region. The reliability risk regions may be one or more neighboring super pages adjacent to a super page including the target region. The reliability risk regions may be super pages including one or more neighboring regions adjacent to the target region. The reliability risk regions may include pages with the same offset values as neighboring regions of the target region in a super block in which the target region is included. For example, when the target region is the page P12, the reliability risk regions may be super pages XP1 and XP3.

According to an embodiment, when it is determined through the data inspection operation that it is necessary to perform a reclaim operation, the processor 510 may copy the data stored in the reliability risk regions to other regions. According to an embodiment, when it is determined through the data inspection operation that it is necessary to perform a reclaim operation, the processor 510 may perform a garbage collection operation for the entire super block including the target region.

In order to delay a subsequent data inspection operation after performing the data inspection operation, the processor 510 may decrease the first common access count and the second common access count corresponding to the target region by subtraction values. According to an embodiment, the subtraction values may be set as the same value or different values for the first access count and the second access count.

The processor 510 may completely reset, that is, initialize, the second common access count corresponding to a super block for which an erase operation is performed. If all the memory blocks included in a certain super block are erased through, for example, a garbage collection operation, the processor 510 may initialize the second common access count corresponding to the super block.

Summarizing, the processor 510 manages not only a first common access count corresponding to a plurality of pages corresponding to a common hash value but also a second common access count corresponding to a super block, and performs a data inspection operation for neighboring super pages adjacent to the super page including a target region, whereby data reliability may be further improved.

Figure 16:
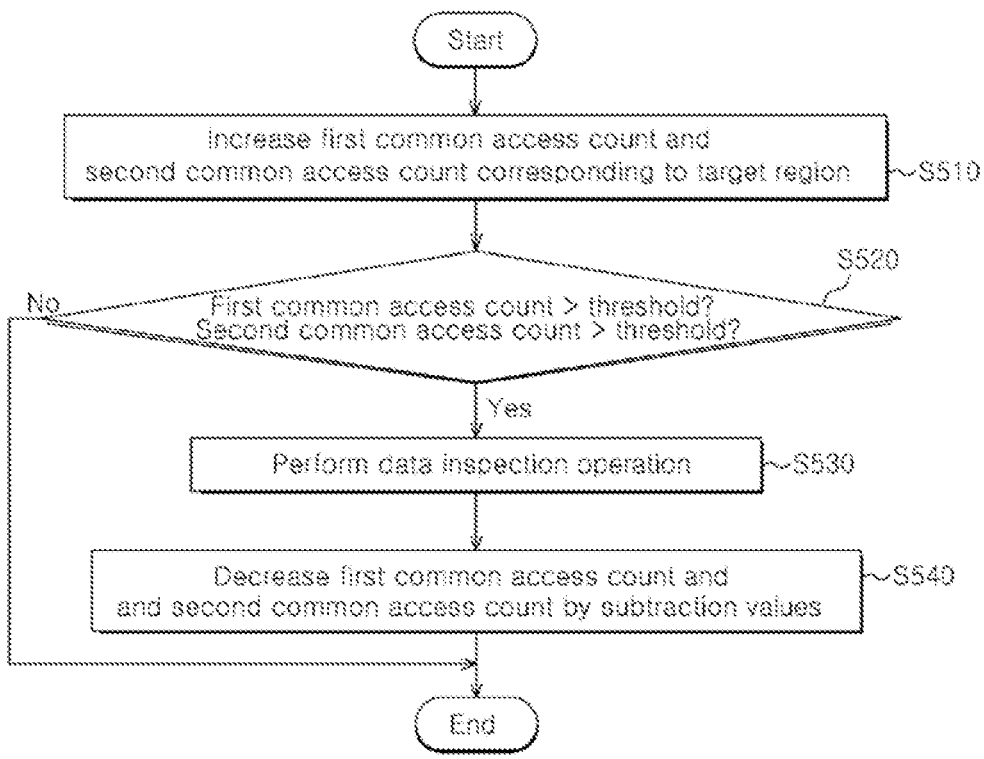
FIG. 16 is a flow chart explaining a method for a reliability maintenance operation of a processor shown in FIG. 15.

FIG. 16 is a flow chart explaining a method for a reliability maintenance operation of the processor 510 shown in FIG. 15. The processor 510 may perform a reliability maintenance operation when accessing a target region.

At step S510, the processor 510 may increase a first common access count and a second common access count corresponding to the target region. The first common access count may correspond to a first group which includes the target region, among first groups into which regions of a first unit are grouped. The regions of the first unit may be, for example, pages. The second common access count may correspond to a second group which includes the target region, among second groups into which regions of a second unit are grouped. The regions of the second unit may be, for example, memory blocks.

At step S520, the processor 510 may determine whether the first common access count and the second common access count respectively exceed thresholds. The thresholds may be set as the same value or different values for the first common access count and the second common access count. When it is determined that the first common access count and the second common access count exceed the thresholds, the process may proceed to step S530. When it is determined that the first common access count and the common second access count do not exceed the thresholds, the process may be ended.

At step S530, the processor 510 may perform a data inspection operation. According to an embodiment, the processor 510 may perform the data inspection operation for reliability risk regions including neighboring regions adjacent to the target region.

At step S540, the processor 510 may decrease the first common access count and the second common access count by subtraction values. The subtraction values may be set as the same value or different values for the first common access count and the second common access count.

Figure 17:
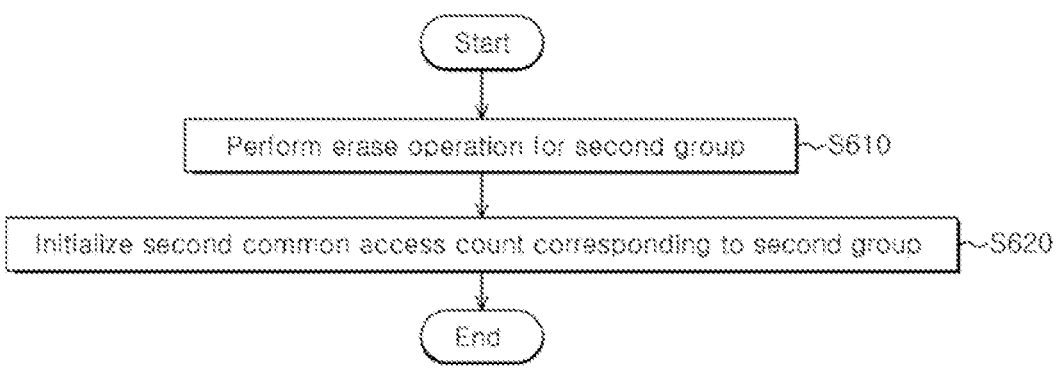
FIG. 17 is a flow chart explaining a method for initializing a second access count in a processor shown in FIG. 15.

FIG. 17 is a flow chart explaining a method for initializing a second common access count in the processor 510 shown in FIG. 15.

At step S610, an erase operation may be formed for a certain second group among second groups into which regions of a second unit are grouped. The certain second group may be erased through, for example, a garbage collection operation.

At step S620, the processor 510 may initialize the second common access count corresponding to the second group for which the erase operation is performed.

As is apparent from the above descriptions, the data storage device according to the embodiments may provide improved data reliability.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device comprising:
a nonvolatile memory apparatus including a target region;
a controller configured to:
update an access request count in response to every read request received to the data storage device;
update an access count corresponding to a target region in response to receiving a read request for the target region; and
initialize the access count each time the access request count reaches a first threshold;
wherein the nonvolatile memory apparatus is configured to access the target region based on a control of the controller.

2. The data storage device of claim 1, wherein the controller increases the access request count by one or more depending on a size of read-requested data.

3. The data storage device of claim 1, wherein the controller maps an address of the target region into one hash value of a plurality of hash values based on a hash function, and updates the access count indexed by the hash value in an access count table that includes a plurality of access counts indexed by the plurality of hash values.

4. The data storage device of claim 1,
wherein the access count corresponds to a plurality of regions of the nonvolatile memory apparatus, which include the target region, in common, and
wherein the controller updates the access count when any one of the plurality of regions is accessed.

5. The data storage device of claim 4, wherein the plurality of regions correspond to different word lines.

6. The data storage device of claim 1, wherein the controller performs a data inspection operation for one or more neighboring regions adjacent to the target region when the access count reaches a second threshold.

7. The data storage device of claim 6, wherein the controller decreases the access count by a subtraction value after performing the data inspection operation.

8. A method for operating a data storage device, comprising:
updating an access request count in response to every read request received to the data storage device;
updating a first access count corresponding to a target region of a nonvolatile memory apparatus in response to receiving a read request for the target region; and
initializing the first access count each time the access request count reaches a first threshold.

9. The method of claim 8, wherein the updating of the access request count comprises:
increasing the access request count by one or more depending on a size of read-requested data.

10. The method of claim 8, wherein the updating of the first access count comprises:
mapping an address of the target region into a first hash value of a plurality of hash values based on a first hash function; and
increasing the first access count indexed by the first hash value in an access count table that includes a plurality of access counts indexed by the plurality of hash values.

11. The method of claim 8,
wherein the first access count corresponds to a plurality of regions of the nonvolatile memory apparatus, which include the target region, in common, and
wherein the plurality of regions correspond to different word lines.

12. The method of claim 8, further comprising:
performing a data inspection operation for one or more neighboring regions adjacent to the target region when the first access count reaches a second threshold.

13. The method of claim 12, further comprising, after the performing of the data inspection operation:
decreasing the first access count by a subtraction value.

14. The method of claim 8, further comprising:
updating a second access count corresponding to the target region based on the read request; and
initializing the second access count each time the access request count reaches the first threshold,
wherein the updating of the second access count comprises:
mapping an address of the target region into a second hash value of a plurality of hash values based on a second hash function; and
increasing the second access count indexed by the second hash value in an access count table that includes a plurality of access counts indexed by the plurality of hash values.

15. A method for operating a data storage device, comprising:
- mapping an address of a target region, which is read-requested, into a first hash value of a plurality of hash values based on a first hash function;
- updating a first access count indexed by the first hash value in an access count table that includes a plurality of access counts indexed by the plurality of hash values in response to receiving a read request to the target region;
- updating an access request count in response to every read request received to the data storage device; and
- initializing the plurality of access counts each time the access request count reaches an initialization threshold.

16. The method of claim 15, wherein the updating of the access request count comprises:
- increasing the access request count by one or more depending on a size of read-requested data.

17. The method of claim 15,
- wherein the first access count corresponds to a plurality of regions of the nonvolatile memory apparatus, which include the target region, in common, and
- wherein the plurality of regions correspond to different word lines.

18. The method of claim 15, further comprising:
- performing a data inspection operation for one or more neighboring regions adjacent to the target region, when the first access count reaches a threshold; and
- decreasing the first access count by a subtraction value.

19. The method of claim 15, further comprising:
- mapping the address of the target region into a second hash value of the plurality of hash values based on a second hash function; and
- updating a second access count indexed by the second hash value in the access count table.

20. A data storage device comprising:
- a storage medium including a plurality of nonvolatile memory apparatuses; and
- a controller configured to update a first access count and a second access count when reading a target region of the storage medium,
- wherein the first access count corresponds to a first group including the target region, among first groups into which regions of a first unit are grouped in the storage medium, and the second access count corresponds to a second group including the target region, among second groups into which regions of a second unit are grouped in the storage medium;
- wherein the controller performs a data inspection operation for reliability risk regions including one or more neighboring regions adjacent to the target region, when the first access count and the second access count exceed thresholds.

21. The data storage device of claim 20,
- wherein the regions of the first unit are pages, and
- wherein pages grouped into the first group correspond to a common hash value based on a hash function.

22. The data storage device of claim 20,
- wherein the regions of the second unit are memory blocks, and
- wherein the second group is a super block which includes respective memory blocks of the plurality of nonvolatile memory apparatuses.

23. The data storage device of claim 20, wherein the controller manages a first access count table that includes first access counts respectively corresponding to the first groups, and manages a second access count table that includes second access counts respectively corresponding to the second groups.

24. The data storage device of claim 20, wherein the reliability risk regions
- include regions which have the same offset values as the one or more neighboring regions in the second group.

25. The data storage device of claim 20, wherein the controller decreases the first access count and the second access count by subtraction values, respectively, after performing the data inspection operation. and manages a second access count table that includes second access counts respectively corresponding to the second groups.

26. The data storage device of claim 20, wherein the controller initializes the second access count when an erase operation is performed for the second group.

27. A data storage device comprising:
- a storage medium including a plurality of nonvolatile memory apparatuses; and
- a controller configured to update a first access count and a second access count when reading a target region of the storage medium,
- wherein the first access count corresponds to a plurality of first unit regions which include the target region and correspond to a common hash value based on a hash function, and the second access count corresponds to a super block which includes the target region and second unit regions of the respective nonvolatile memory apparatuses;
- wherein the controller performs a data inspection operation for reliability risk regions including one or more neighboring regions adjacent to the target region, when the first access count and the second access count exceed thresholds.

28. The data storage device of claim 27, wherein the controller updates an access request count based on a received read request, and initializes the first access count each time the access request count reaches an initialization threshold.

29. A method for operating a data storage device, comprising:
- reading a target region of a storage medium including a plurality of nonvolatile memory apparatuses;
- responsive to the reading:
  - updating a first access count corresponding to a first group including the target region, among first groups into which regions of a first unit are grouped in the storage medium; and
  - updating a second access count corresponding to a second group including the target region, among second groups into which regions of a second unit are grouped in the storage medium; and
- performing a data inspection operation for reliability risk regions including one or more neighboring regions adjacent to the target region, when the first access count and the second access count exceed thresholds.

30. The method of claim 29, further comprising, after the performing of the data inspection operation:
- decreasing the first access count and the second access count by subtraction values.

31. The method of claim 29, further comprising:
- performing an erase operation for the second group; and
- initializing the second access count.

* * * * *